(12) United States Patent
Slutskii et al.

(10) Patent No.: US 10,702,876 B2
(45) Date of Patent: Jul. 7, 2020

(54) SYSTEM, COMPOSITION, AND METHOD FOR DISPENSING A SPRAYABLE FOAMABLE PRODUCT

(71) Applicants: Konstantin Dragan, Moscow (RU);
Vitalii Titorov, Moscow (RU)

(72) Inventors: Sergei Slutskii, Moscow Oblast (RU);
Vitalii Titorov, Moscow (RU)

( * ) Notice: Subject to any disclaimer, the term of this patent is extended or adjusted under 35 U.S.C. 154(b) by 275 days.

(21) Appl. No.: 15/833,852

(22) Filed: Dec. 6, 2017

(65) Prior Publication Data
US 2018/0104705 A1    Apr. 19, 2018

Related U.S. Application Data

(63) Continuation-in-part of application No. 15/172,575, filed on Jun. 3, 2016, now abandoned.

(51) Int. Cl.
*B05B 1/00*    (2006.01)
*B05B 1/02*    (2006.01)
(Continued)

(52) U.S. Cl.
CPC .............. *B05B 1/02* (2013.01); *B05B 1/3006* (2013.01); *B05B 7/0025* (2013.01);
(Continued)

(58) Field of Classification Search
CPC ....... B05B 1/046; B05B 1/044; B05B 7/0018; C08G 18/3206; C08G 18/7671;
(Continued)

(56) References Cited

U.S. PATENT DOCUMENTS 1,559,655 A * 11/1925 Thompson .............. B05B 1/046
239/521
2,722,458 A * 11/1955 Wahlin .................... B05B 1/042
239/597
(Continued)

FOREIGN PATENT DOCUMENTS

| CA | 1137698 | 12/1982 |
|---|---|---|
| GB | 1273554 | 5/1972 |
| WO | 2015/041552 | 3/2015 |

OTHER PUBLICATIONS

TAP Plastics, Vinyl Tubing, Apr. 15, 2012, http://www.tapplastics.com/product/plastics/plastic_rods_tubes_shapes/vinyl_tubing/145.
(Continued)

*Primary Examiner* — Viet Le
(74) *Attorney, Agent, or Firm* — Cislo & Thomas, LLP

(57) ABSTRACT

A system for the application of foamable chemical compositions is presented. The application system comprises an ergonomic handle/adapter removably attachable to a pressurized source of a foam product, the handle having inlet and outlet orifices or openings for flow of the foam product from the pressurized source to a nozzle, the nozzle having an outlet orifice for dispensing the foam product and an inlet orifice for connecting to a flexible tubular connecting member which interconnects the outlet orifice of the handle/adapter with the inlet orifice of the nozzle. The nozzle of the present invention includes design features to produce a fan shaped spray pattern of the foam product and to reduce the incidence of leakage or dripping of either moisture or the foam product at the nozzle's outlet. The tubular connecting member is flexible and therefore allows a user to spray foam into hard to reach places.

19 Claims, 9 Drawing Sheets

(51) Int. Cl.

| | | |
|---|---|---|
| *B05B 1/30* | (2006.01) | |
| *C08G 18/42* | (2006.01) | |
| *B05B 7/04* | (2006.01) | |
| *E04B 1/76* | (2006.01) | |
| *C08G 18/48* | (2006.01) | |
| *B05B 7/00* | (2006.01) | |
| *B05B 12/22* | (2018.01) | |
| *C08J 9/14* | (2006.01) | |
| *B65D 83/30* | (2006.01) | |
| *B65D 83/20* | (2006.01) | |
| *B65D 83/14* | (2006.01) | |
| *B05B 15/65* | (2018.01) | |
| *C08G 101/00* | (2006.01) | |
| *B05B 1/28* | (2006.01) | |
| *B05B 1/06* | (2006.01) | |
| *B05B 1/04* | (2006.01) | |

(52) U.S. Cl.
CPC ............ *B05B 7/0416* (2013.01); *B05B 12/22* (2018.02); *B65D 83/20* (2013.01); *B65D 83/303* (2013.01); *B65D 83/752* (2013.01); *C08G 18/42* (2013.01); *C08G 18/4825* (2013.01); *C08J 9/141* (2013.01); *E04B 1/7604* (2013.01); *B05B 1/048* (2013.01); *B05B 1/06* (2013.01); *B05B 1/28* (2013.01); *B05B 15/65* (2018.02); *C08G 2101/00* (2013.01); *C08J 2203/14* (2013.01); *C08J 2207/04* (2013.01); *C08J 2375/04* (2013.01)

(58) Field of Classification Search
CPC ...... C08J 9/0042; C08J 9/141; C08J 2203/14; C08J 2375/04
USPC ........................................................ 239/299
See application file for complete search history.

(56) References Cited

U.S. PATENT DOCUMENTS

| | | | | |
|---|---|---|---|---|
| 2,768,101 A * | 10/1956 | Fairchild | ................ | B05B 1/046 134/34 |
| 2,785,005 A * | 3/1957 | Thompson | ................ | B05B 1/12 239/575 |
| 2,981,712 A * | 4/1961 | Harper | ............... | C08G 18/7621 524/364 |
| 2,985,386 A * | 5/1961 | Steinen | ................... | B05B 1/042 239/597 |
| 3,085,754 A * | 4/1963 | Thompson | ............. | B05B 1/267 239/523 |
| 3,091,551 A * | 5/1963 | Robertson | .......... | C08G 18/0895 427/426 |
| 3,101,906 A * | 8/1963 | Webber | .................. | B05B 1/044 239/592 |
| 3,236,455 A * | 2/1966 | Lewis | ...................... | B05B 9/01 239/11 |
| 3,301,493 A * | 1/1967 | Frempter | ................ | B05B 1/267 239/590 |
| 3,313,353 A * | 4/1967 | Williamson | ............. | B05B 1/28 169/47 |
| 3,401,888 A * | 9/1968 | Sutter | .................... | B65D 83/20 239/568 |
| 3,556,411 A * | 1/1971 | Nord | ........................ | B05B 1/00 239/581.1 |
| 3,647,147 A * | 3/1972 | Cook | ...................... | B05B 1/042 239/599 |
| 3,659,787 A * | 5/1972 | Ito | ............................ | B05B 1/02 239/708 |
| 3,737,108 A * | 6/1973 | Stumphauzer | ........... | B05B 1/04 239/598 |
| 3,754,710 A * | 8/1973 | Chimura | ................. | B05B 1/042 239/597 |
| 3,843,055 A * | 10/1974 | Nord | ........................ | B05B 1/04 239/599 |
| 3,857,809 A * | 12/1974 | Oertel | ................ | C08G 18/0852 528/48 |
| 3,927,162 A * | 12/1975 | Stalter, Sr. | ............ | B29C 44/367 264/51 |
| 4,071,195 A * | 1/1978 | Kuhns | ..................... | B05B 1/267 239/289 |
| 4,097,000 A * | 6/1978 | Derr | ........................ | B05B 1/042 239/599 |
| 4,117,551 A * | 9/1978 | Brooks | .................. | B05B 7/1209 366/162.1 |
| 4,213,936 A * | 7/1980 | Lodrick | ................ | B05B 12/008 239/416.1 |
| 4,236,674 A * | 12/1980 | Dixon | ..................... | B05B 7/066 239/296 |
| 4,330,086 A * | 5/1982 | Nysted | ................... | B05B 7/0068 169/5 |
| 4,346,849 A * | 8/1982 | Rood | ........................ | B05B 1/00 239/597 |
| 4,618,101 A * | 10/1986 | Piggott | ................... | B05B 1/042 239/589 |
| 4,641,785 A * | 2/1987 | Grothe | ............... | B22D 11/1246 164/444 |
| 4,646,977 A * | 3/1987 | Iwamura | .................. | B05B 1/02 239/590.5 |
| 4,759,500 A * | 7/1988 | Hoffman | ................ | B01D 51/10 239/13 |
| 4,811,903 A * | 3/1989 | Okuma | ................... | B05B 1/046 239/284.2 |
| 4,882,107 A * | 11/1989 | Cavender | ............... | B05D 1/025 264/51 |
| 5,141,156 A * | 8/1992 | Hoy | ........................ | B05B 7/32 239/135 |
| 5,143,302 A * | 9/1992 | Sakuma | ................... | B05B 1/042 239/599 |
| 5,167,371 A * | 12/1992 | Rohner | ................... | B05B 1/042 239/597 |
| 5,178,325 A * | 1/1993 | Nielsen | ................... | B05B 1/042 239/1 |
| 5,178,326 A * | 1/1993 | Kukesh | ................... | B05B 7/06 239/11 |
| 5,185,383 A * | 2/1993 | Regenauer | ......... | C08G 18/4816 521/155 |
| 5,275,340 A | 1/1994 | Haruch | | |
| 5,287,994 A * | 2/1994 | Dempsey | ................. | B67D 3/00 111/7.1 |
| 5,464,154 A * | 11/1995 | Nielsen | ................... | B05B 1/042 239/1 |
| 5,549,226 A * | 8/1996 | Kopp | .................... | B65D 83/303 222/402.13 |
| 5,597,122 A * | 1/1997 | Eisenmann | ............. | B05B 1/048 239/589 |
| 5,631,319 A | 5/1997 | Reese et al. | | |
| 6,136,942 A * | 10/2000 | Pfenninger | ............ | C08G 18/12 252/182.2 |
| 6,371,392 B1 * | 4/2002 | Steinman | ................ | B05B 1/323 239/533.13 |
| 6,414,045 B1 * | 7/2002 | Heimpel | ................ | C08G 18/12 521/130 |
| 6,552,097 B1 * | 4/2003 | Pauls | .................... | C08G 18/10 222/491 |
| 6,872,337 B2 * | 3/2005 | Mellentine | ............. | B05B 7/061 264/250 |
| 6,894,083 B2 * | 5/2005 | Braun | .................... | C08G 18/12 521/159 |
| 7,111,799 B2 * | 9/2006 | Batich | ..................... | B21C 5/00 138/109 |
| 7,717,357 B2 * | 5/2010 | Gantenbein | ........... | B01F 5/0619 222/145.6 |
| 7,842,749 B2 * | 11/2010 | Shalaby | ................ | A61L 26/0014 524/556 |
| 7,958,609 B2 * | 6/2011 | Gaydoul | ................ | B21B 45/08 29/81.08 |
| 8,003,708 B2 * | 8/2011 | Javarone | ............... | C08G 18/4018 521/173 |

(56) References Cited

U.S. PATENT DOCUMENTS

| | | | | |
|---|---|---|---|---|
| 8,118,052 | B2 * | 2/2012 | Swab | B29C 44/367 137/208 |
| 8,299,171 | B2 * | 10/2012 | Schmalkuche | C08G 18/10 524/196 |
| 8,324,340 | B2 * | 12/2012 | Burckhardt | C08G 18/10 156/331.1 |
| 8,557,886 | B2 * | 10/2013 | Golini | C08G 18/4027 521/155 |
| 8,590,816 | B2 * | 11/2013 | Ballu | B05B 1/048 239/589 |
| 10,350,617 | B1 | 7/2019 | Slutskii et al. | |
| 2003/0234301 | A1 * | 12/2003 | Swan | B05B 1/046 239/429 |
| 2004/0124268 | A1 * | 7/2004 | Frazier | B01F 5/0256 239/398 |
| 2004/0157945 | A1 | 8/2004 | Barber | |
| 2005/0150982 | A1 * | 7/2005 | Lopez | B60S 1/481 239/601 |
| 2005/0222289 | A1 | 10/2005 | Miller | |
| 2006/0182978 | A1 | 8/2006 | Leroy et al. | |
| 2007/0039547 | A1 * | 2/2007 | Lacchia | B05B 1/046 118/629 |
| 2007/0069047 | A1 * | 3/2007 | Bolman | B05B 1/046 239/427 |
| 2007/0254973 | A1 * | 11/2007 | Emge | C08G 18/8108 521/170 |
| 2008/0067720 | A1 | 3/2008 | Wiese et al. | |
| 2008/0087745 | A1 * | 4/2008 | Pearson | B05B 1/046 239/428.5 |
| 2008/0290197 | A1 * | 11/2008 | Fecht | B05B 1/042 239/599 |
| 2009/0107068 | A1 * | 4/2009 | Fay | E04B 1/7604 52/309.6 |
| 2009/0230221 | A1 | 9/2009 | Ballu | |
| 2009/0272826 | A1 * | 11/2009 | Kioi | B05B 1/042 239/601 |
| 2011/0059255 | A1 * | 3/2011 | Ogonowski | B05B 1/042 427/422 |
| 2011/0121034 | A1 * | 5/2011 | Swab | B05B 7/0025 222/145.1 |
| 2012/0128964 | A1 | 5/2012 | Hulse et al. | |
| 2013/0266736 | A1 * | 10/2013 | Wickert | C04B 41/483 427/427 |
| 2013/0324626 | A1 | 12/2013 | Fabisiak et al. | |
| 2014/0051776 | A1 * | 2/2014 | Chen | C08G 18/1808 521/126 |
| 2014/0224828 | A1 * | 8/2014 | Demey | B05B 1/3073 222/23 |
| 2015/0018508 | A1 | 1/2015 | Verbeke et al. | |
| 2015/0018509 | A1 | 1/2015 | Verbeke et al. | |
| 2015/0079406 | A1 * | 3/2015 | Tennebroek | C08G 18/0823 428/423.1 |
| 2015/0144249 | A1 | 5/2015 | Bowe et al. | |
| 2015/0217336 | A1 * | 8/2015 | Seidel | B21B 45/0233 134/15 |
| 2015/0274967 | A1 | 10/2015 | Taylor | |
| 2015/0321206 | A1 * | 11/2015 | Swan | B05B 1/046 239/8 |
| 2016/0271666 | A1 * | 9/2016 | Huber | B08B 3/022 |
| 2016/0288075 | A1 * | 10/2016 | Lacroix | B05B 1/044 |
| 2016/0318050 | A1 * | 11/2016 | Zaarbelink | B05B 7/2472 |
| 2017/0225181 | A1 * | 8/2017 | Hammerlund | B01F 5/0057 |
| 2017/0241131 | A1 * | 8/2017 | Lewis | B32B 5/00 |
| 2017/0333927 | A1 * | 11/2017 | Ross | B05B 12/087 |
| 2017/0341090 | A1 * | 11/2017 | Cameron | B05B 1/046 |
| 2017/0348713 | A1 | 12/2017 | Titorov | |
| 2018/0029566 | A1 * | 2/2018 | Gopalan | B05B 1/046 |
| 2018/0043376 | A1 * | 2/2018 | Titorov | B05B 1/005 |
| 2018/0043379 | A1 * | 2/2018 | Gantenbein | B05B 7/025 |
| 2018/0079881 | A1 * | 3/2018 | Zhang | C08J 9/144 |
| 2018/0104705 | A1 | 4/2018 | Slutskii et al. | |
| 2018/0104709 | A1 * | 4/2018 | Peters | B05B 12/0026 |
| 2018/0111140 | A1 * | 4/2018 | Miller | B01F 5/0602 |
| 2018/0117609 | A1 * | 5/2018 | Hodgkinson | G05D 23/1934 |

OTHER PUBLICATIONS

United States Patent and Trademark Office, Office Action Summary dated Oct. 17, 2016, U.S. Appl. No. 15/172,575, 17 pages.
United States Patent and Trademark Office, Office Action Summary dated Jun. 6, 2017, U.S. Appl. No. 15/172,575, 17 pages.
United States Patent and Trademark Office, Office Action Summary dated Feb. 5, 2018, U.S. Appl. No. 15/429,586, 10 pages.
United States Patent and Trademark Office, Office Action Summary dated May 16, 2018, U.S. Appl. No. 15/429,586, 11 pages.
United States Patent and Trademark Office, Office Action Summary dated Feb. 7, 2019, U.S. Appl. No. 15/429,586, 9 pages.
United States Patent and Trademark Office, Office Action Summary dated Jul. 10, 2018, U.S. Appl. No. 15/955,403, 8 pages.
United States Patent and Trademark Office, Office Action Summary dated Dec. 27, 2018, U.S. Appl. No. 15/955,403, 9 pages.
United States Patent and Trademark Office, Office Action Summary dated May 31, 2018, U.S. Appl. No. 15/955,448, 11 pages.
United States Patent and Trademark Office, Office Action Summary dated Jun. 25, 2018, U.S. Appl. No. 15/955,479, 16 pages.

* cited by examiner

SYSTEM, COMPOSITION, AND METHOD FOR DISPENSING A SPRAYABLE FOAMABLE PRODUCT

CROSS-REFERENCE TO RELATED APPLICATIONS

This patent application is a continuation-in-part of U.S. patent application Ser. No. 15/172,575, filed on Jun. 3, 2016, which application is incorporated in its entirety herein by this reference.

BACKGROUND OF THE INVENTION

Field of the Invention

The present invention relates generally to portable systems for dispensing chemical concentrates such as polyurethane foams and in particular to a spray nozzle that incorporates an opening to provide for a uniform fan or cone-shaped distribution of a foaming product.

Background of the Invention

This invention is particularly well suited for on-site applications of pressurized liquid chemicals dispensed as sprayable foams and more particularly to on-site application of polyurethane foam. On-site applications for polyurethane foam have increased substantially in recent years extending the application of polyurethane foam beyond its traditional usage in the packaging and insulation fields. For example, polyurethane foam is increasingly being used as a sealant in both residential and commercial building construction for sealing spaces between door and window frames, in addition to more traditional uses as an insulator. In cold weather climates, polyurethane foam is now commonly used as an insulator to fill essentially any air space between the wall frames of a structure. Such insulated buildings require substantially less energy to heat than non-insulated buildings.

Polyurethane foam for on-site applications is typically supplied as a "single-component" foam or as a "two-component" foam. With both types of foam, the chemicals which create the foam are typically carried in portable containers, i.e. pressurized cylinders, and applied by an operator via an application gun. With a conventional two-component foam, the principal foamable component is typically supplied in one pressurized container while hardening agent, typically a polymeric isocyanate, is supplied in a second pressurized container. During application of a two-component foam, the pressurized cylinders containing the foamable agents and the hardener are connected to a type of spray gun where the components are mixed in appropriate ratios via metering mechanisms contained in the gun and are subsequently sprayed.

There are two principal problems with two-component polyurethane foam systems. One problem is that the guns are typically made of stainless steel and/or brass and contain precise metering mechanisms that must be cleaned shortly after use. The guns must be cleaned shortly after use because in a two-component system, the foam hardens within a relatively short period of time via chemical reaction with the isocyanate hardener. If the foam is allowed to harden within a gun, the relatively costly gun becomes unusable and typically requires disassembly and the replacement of numerous parts in the metering mechanism to return the gun to a usable state.

The other principal problem with two-component polyurethane foam systems is that the isocyanate based hardener is extremely toxic to the human nervous system. Isocyanates are readily absorbed via inhalation of vapor and skin contact. Therefore, the use of protective clothing and specialized respirators are required by workers applying a two-component polyurethane foam product.

To overcome some of the problems of two-component polyurethane foam systems, one-component foam products have been developed. In a one-component foam product, generally the resin or foamable component and the isocyanate component are supplied in a single pressurized container and dispensed through the container through a valve equipped gun, equipped with a nozzle attached to the pressurized container. With one-component polyurethane foam systems, when the foamable chemicals leave the nozzle, reaction with moisture in the air causes the foam to harden. Single-component polyurethane foam products typically feature less overspray and introduce fewer airborne isocyanates to the atmosphere surrounding the worksite, and are otherwise generally less toxic and safer to use than two-component foam systems.

With the development of single-component polyurethane foam systems, a need has arisen in the art for new foam application hardware that takes advantage of the fact that with a single-component system, there is no need to mix chemical components from two pressurized sources in precise ratios. Ideally, a new single-component foam application system would utilize low cost, easily transportable and easy to clean hardware which would allow the use of single-component polyurethane foams in a wider range of applications.

Current application of the single-component foam was fulfilled by means of a thin stream or a sprinkling "shower", which affected the uniformity of the layer being applied. It is the understanding of the applicants that single-component foams are not used for insulation.

SUMMARY OF THE INVENTION

The foam application system of the present invention comprises a pressurized source of a single-component foamable product, such as single-component polyurethane foam, an ergonomic handle removably attachable to the pressurized source of the foamable product, the handle having inlet and outlet orifices or openings for flow of the foamable product from the pressurized source, a nozzle having an inlet and an outlet orifice for dispensing the foamable product and a tubular connecting member interconnecting the outlet orifice of the handle with the inlet orifice of the nozzle.

The nozzle of the present invention includes design features to produce a fan or cone-shaped spray pattern of the foamable product and is also designed to reduce the incidence of leakage or dripping of either moisture or the foam product at the nozzle's outlet. The nozzle is further designed to be easily attachable and removable from the tubular connecting member, which interconnects the nozzle with the pressurized source of the foamable product. The tubular connecting member is flexible and therefore allows a user to spray foam into hard to reach places, such as seams in walls, under surfaces, behind objects and the like.

Another advantage of the flexible tubular interconnecting member is that it does not need to be cleaned after each use, which provides the foam dispensing system of the present invention with an advantage over conventional systems which utilize spray guns which must be cleaned after each use. This is because the foamable product is pre-mixed in a single container, thereby eliminating the hardware needed for proper metering of the two separate compositions in a two-component system.

The present invention is the perfect thermal insulator. It is used for construction purposes (walls, partition walls), it is also used as the thermal insulation for the attics floor, roof, basement, socle and so on. In the automotive industry it is used as heat and noise insulation, as thermal insulation of wagons, refrigerators, and insulated tank trucks. In shipbuilding it is used for heat-insulating of bulkheads, which prevents the formation of vapors. It is used in any other industry where the quality insulation is needed, such as houses, roofs, frontons, walls, floor, socle, and foundation.

The competitive advantages of the present invention in comparison with the two-component sealing foam are as follows:

This system has an ecological benefit because the main reaction of polymerization of isocyanate and polyol takes place inside the container. Unlike the two-component foam where the reaction between MDI and glycols takes place directly during the spraying process, with infiltration of numerous hazardous emissions; with regard to our product this reaction takes place inside the container at the manufacturing site, therefore elimination of hazardous emissions are possible, in contrast to two-components foam.

One container may contain enough composition to cover 1 square meter, which makes it very practical for consumers. It does not need additional electrical equipment for spraying, which significantly reduces the procedure costs. There is no necessity in qualified personnel to fulfill the spraying; it can be done by any person who just got acquainted with the manual.

The combination of all novelties, implemented in the present invention makes it possible to spray the single-component foamed polyurethane ("PU") over the surface with a capacity of 1 square meter per 60 seconds, gaining a thickness of the coated layer up to 30-50 mm without usage of any additional equipment. This insulator can be installed in the places difficult for access, in the absence of the electric network. Practically, all the features starting from the mechanism of the reaction, foaming and filling of the holes up to the curing time and the spraying technique differentiate this polymer from all known two-component spraying systems.

The composition is sprayed through a connector-tube (the connector-tube can be rigid, semi-rigid, or soft), which is connected to a pressure vessel (can) containing pre-polymer from one side and to a special nozzle from the other side. The nozzle can be rigid, semi-rigid, or soft.

The width of a spraying cone (for flat nozzle) by means of a special nozzle depends on the temperature of the balloon as well as on the distance to the sprayed surface, and can vary from 100 to 400 mm. The distance from the nozzle tip to the sprayed surface must be within 100 to 800 mm. The geometry of the sprayed cone is specially designed so that within one running the polymer would spray over the processed surface in one very smooth layer; and so that after the final foaming which takes place not earlier than 15 minutes after spraying, the layer will be still smooth and uniform. Any other geometrical configurations of the cone cause irregularities of the surface, which lead to excessive consumption of the spraying system.

The consumption rate for the balloon with the trigger being steadily pulled is from 6 grams per second from 10 grams per second.

The invention implies the method of application of foamed polyurethane product on the surface in combination with the principle of its foaming and polymerization as well as the limited usage of the components which the polyol consists of. Until present time nobody used single-component foamed PU in an aerosol disposable (non-rechargeable) containers as a self-consistent thermal insulator. This single-component foamed PU has never been sprayed out of aerosol containers on the coated surfaces with the purpose of providing the thermal insulation and windshield, vapour barrier as well as the improvement of structural parameters in general.

In this very insulator, the gas component plays not only the role of the foaming agent but also participate in the formation of the very structure of polymer at the moment of its spraying. The novelty of the invention also implies the special additional nozzle tip which is mounted on the spraying gun and is shaped into an adjustable spraying cone with which the uniformity of the application of polymer on the surface can be controlled. This insulator can be installed in the places difficult for access, in the absence of the electric network. Practically, all the features starting from the mechanism of the reaction up to the curing time and the spraying technique differentiate it from the known two-component spraying foamed PU systems.

Other advantages and novel features of the invention will become more apparent from the following detailed description of the invention when taken in conjunction with the accompanying drawings.

DETAILED DESCRIPTION OF THE PREFERRED EMBODIMENTS

The present invention will now be described more fully hereinafter with reference to the accompanying drawings, in which preferred embodiments of the invention are shown. The invention may, however, be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 1:
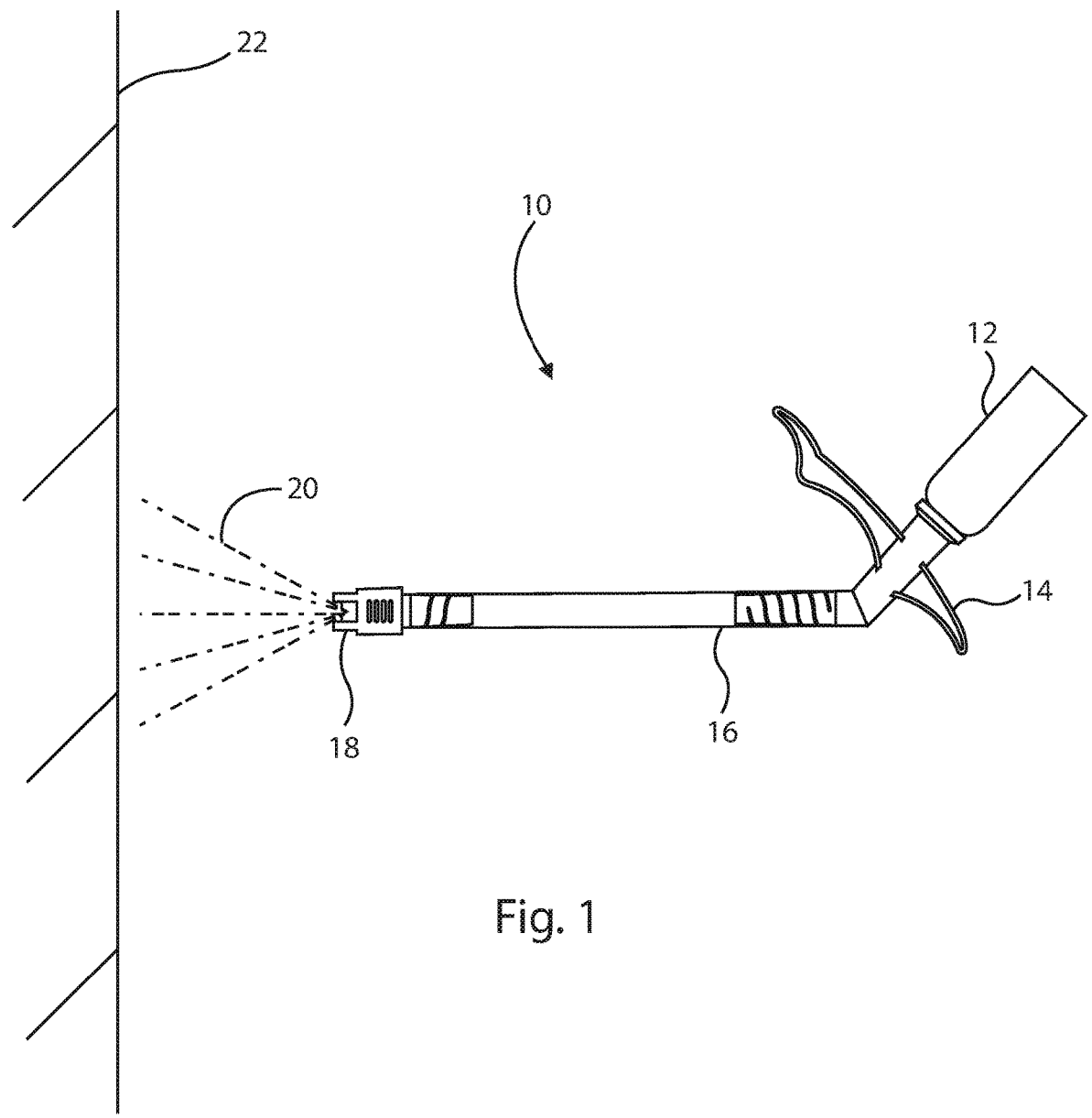
FIG. 1 is a schematic view showing one example of the arrangement of components of the foam dispensing system of the present invention, spraying foam against a wall.

With reference to FIG. 1, the foam dispensing system 10 of the present invention comprises a pressurized source of a sprayable foam material 12, an adapter-handle 14, a flexible coupler 16 and a nozzle 18. In use, the adapter-handle 14 is connected to the source of pressurized sprayable foam material 12 and in turn is connected to the flexible coupler 16 which is connected to the nozzle 18. For exemplary purposes only, FIG. 1 depicts the foam dispensing system 10 of the present invention spraying foam material 20 against a surface, such as a wall 22.

Figure 2:
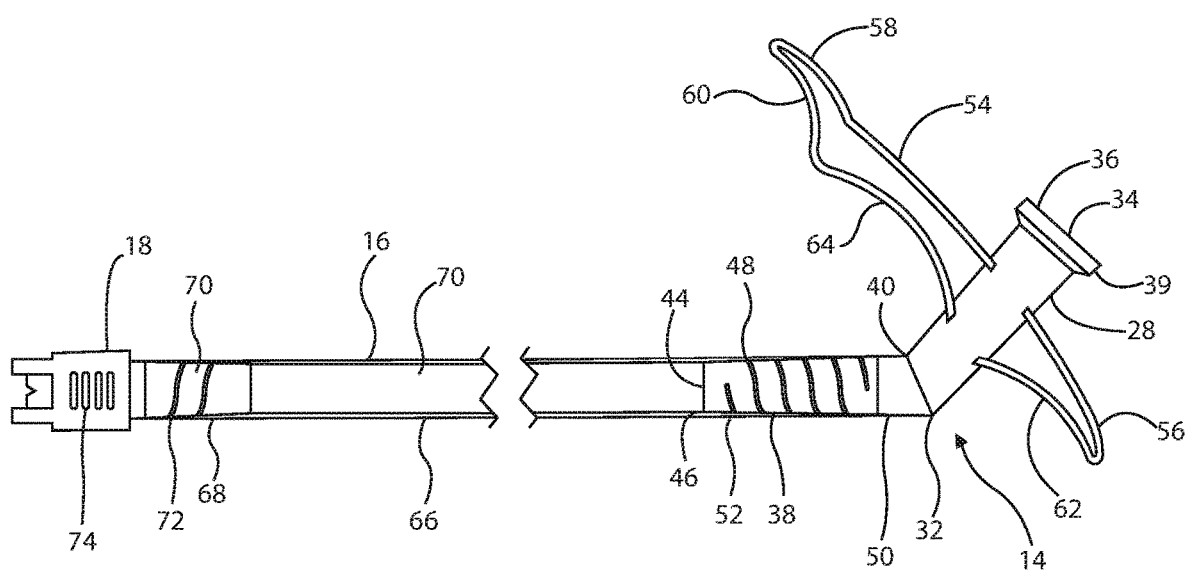
FIG. 2 is a side view of the foam dispensing system of FIG. 1, with the source of a pressurized foamable product (i.e. pressurized cylinder) not shown.
Figure 3:
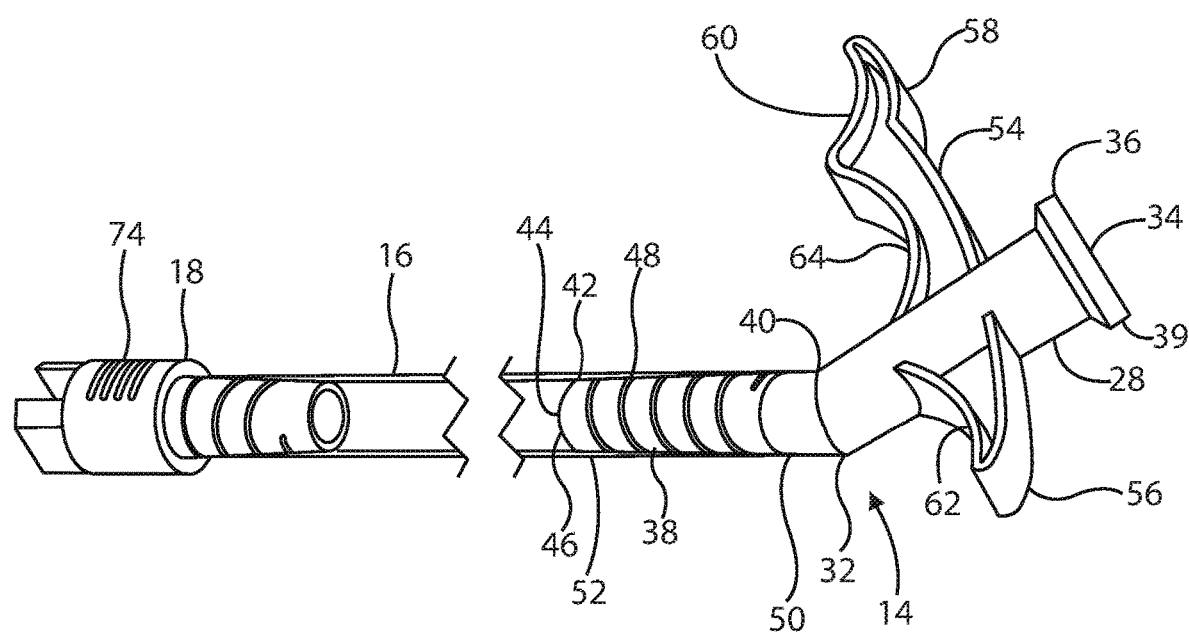
FIG. 3 is a perspective view of the foam dispensing system of FIG. 1, with the pressurized cylinder not shown.

With reference to FIGS. 2 and 3, the adapter-handle 14 includes a handle portion 28 and a coupler portion 38. The handle portion 28 has an upper end 39 and a lower end 32 and a generally circular bore 34 therebetween. At the upper end 39 is a generally circular inlet opening or orifice 36. The inlet opening 36 will typically include a means which allows the inlet opening 36 to be attached to the pressurized source of a sprayable foam material 12. Generally, the attachment means will constitute screw threads (not shown). Typically, the pressurized source of a sprayable foam material 12 will have an externally threaded outlet (not shown) to which the outlet opening 36 of the handle portion 28 of the adapter-handle 14 is attachable via an internal thread formed in the outlet opening 36.

The adapter-handle 14 also includes the coupler portion 38. The coupler portion 38 includes a forward end 40 and an aft end 42, with a generally circular bore 44 therebetween. The generally circular bore 44 of the coupler portion 38 and the generally circular bore 34 of the handle portion 28 are in fluid communication with each other. The coupler portion 38 also includes an outlet opening or orifice 46 and also includes one or more grooves 48, which may be spiral grooves, about an exterior surface 50 of the coupler portion 38. The grooves 48 function to assist in securing a proximate end 52 of the flexible coupler 16 to the exterior surface 50 of the coupler portion 28.

Generally, the proximate end 52 of the flexible coupler 16 will be a friction fit with the exterior surface 50 of the coupler portion 28. The one or more grooves 48 formed on the exterior surface 50 of the coupler portion 28 assist an operator in sliding the proximate end 52 of the flexible coupler 16 onto the coupler portion 28 of the adapter-handle 14. Optionally, the proximate end 52 of the flexible coupler 16 may be secured to the exterior surface 50 of the coupler portion 28 by means of hose clamps (not shown). Many types of hose clamps are suitable and known in the art.

The adapter-handle 14 of the present invention also includes a finger grip portion 54 which includes a lower finger grip 56 and an upper finger grip 58. An underside of the finger grip 56 has a curved portion 62 and an underside of the upper finger grip 54 has two curved portions 60 and 64. The curved design of the lower and upper grip portions provides for an ergonomic grip that allows a user to readily grasp and use the adapter-handle 14, including in cold weather climates where the use of gloves may be required.

With continued reference to FIGS. 2-3, the flexible coupler 16 is a flexible tube having a distal end 68 and a proximate end 52 with a bore 70 therebetween. The proximate end 52 of the flexible coupler slides over the exterior surface 50 of the coupler portion 38 of the adapter-handle 14 in a friction fit relationship. The distal end 68 of the flexible coupler 16 likewise slide overs a rear exterior surface 70 of the nozzle 18 in a friction fit relationship. The rear exterior surface 70 of the nozzle 18 may be optionally be equipped with one or more grooves 72, which may be spiral grooves, to assist in sliding the distal end 68 of the flexible coupler 16 over the rear exterior surface 70 of the nozzle 18. Optionally, hose clamps (not shown) may be used at either or both of the proximate or the distal end connections. The nozzle 18 may also be equipped with a one or more ribs 74 formed on the nozzle. The one or more ribs 74 function as finger grips which allow a user to push exterior surface 70 of the nozzle 18 into the distal end 68 of the flexible coupler 16.

The flexible coupler 16 may be made from any number of materials including rubber, woven cloth and plastic materials. However, clear, semi-ridged or flexible plastic materials such as polypropylene or polyethylene are preferred because a user may monitor the flow of pressurized chemicals through the tube if the tube is constructed of a clear material. In addition, the flexible coupler 16 can be bent to access hard to reach places. Hard to reach places are generally places that are blocked or obscured such that standing directly in front of the structure and spraying with a sweeping left to right or up and down motion would not sufficiently cover the hard to reach place.

With reference to FIGS. 4-9, the nozzle 18 of the foam dispensing system of the present invention 10 includes a pressure chamber 76 having a proximate end 78 and distal end 80 with a generally circular bore 82 therebetween. Immediately adjacent, the pressure chamber 76 is a nozzle head 84. In fluid communication with the distal end 80 of the generally circular bore 82 of the pressure chamber 76 is a discharge tube 86 which has a proximate end 88 which is exposed to the generally circular bore 82 of the pressure chamber 76. The discharge tube 86 terminates at a distal end 96 which terminates in a discharge orifice 90, (best shown in FIGS. 6 and 9).

Figure 4:
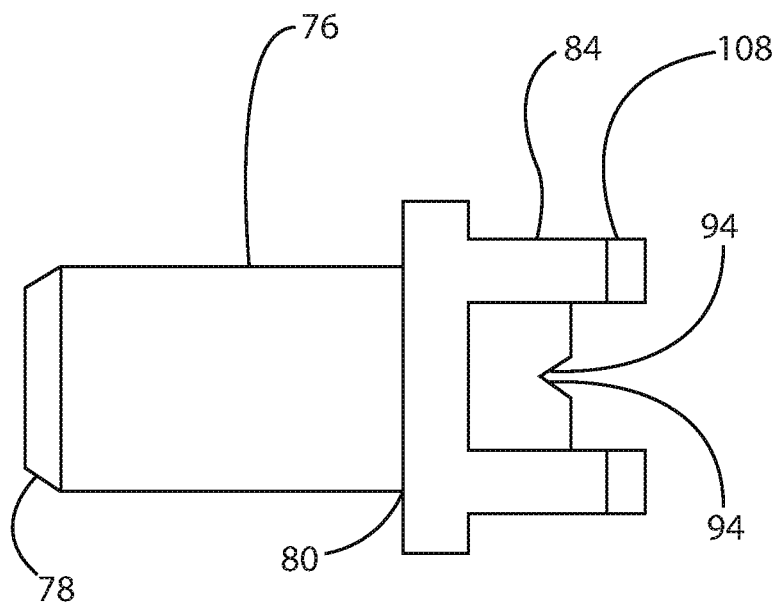
FIG. 4 is a side view of the nozzle of the foam dispensing system of FIG. 1.
Figure 5:
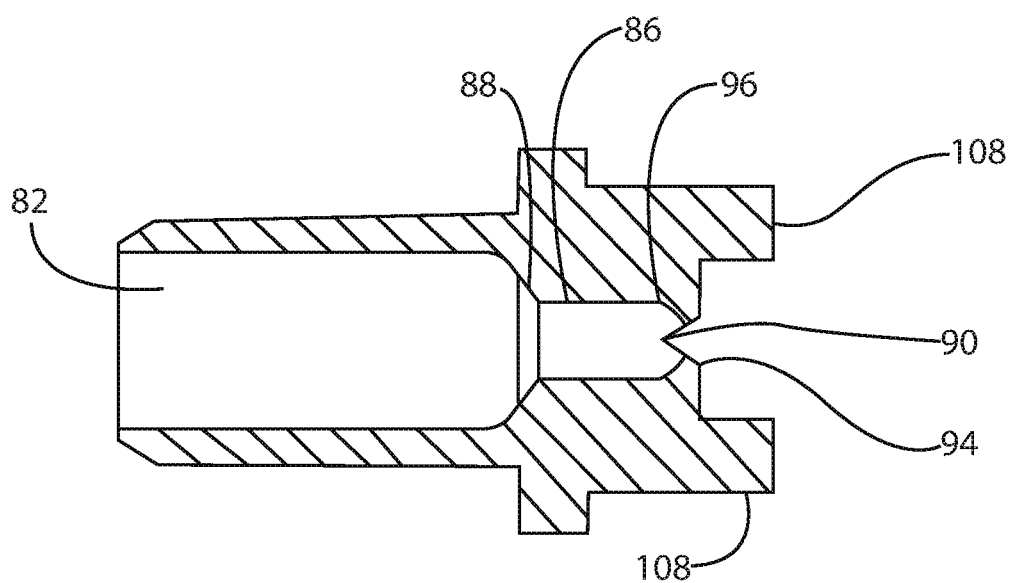
FIG. 5 is a cross sectional view of the nozzle of the foam dispensing system shown in FIG. 4.
Figure 6:
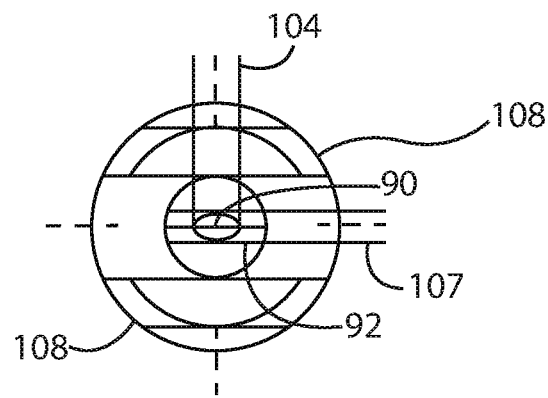
FIG. 6 is a front end view of the nozzle of the foam dispensing system shown in FIG. 4.
Figure 7:
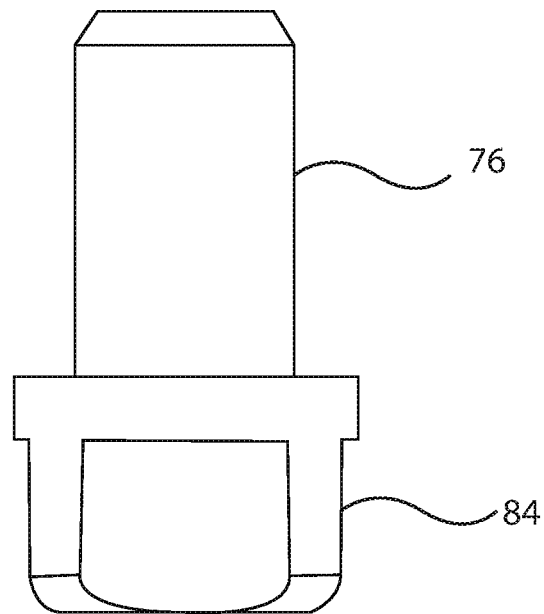
FIG. 7 is a side view, rotated 900 about the longitudinal axis of the nozzle of the foam dispensing system shown in FIG. 4.
Figure 8:
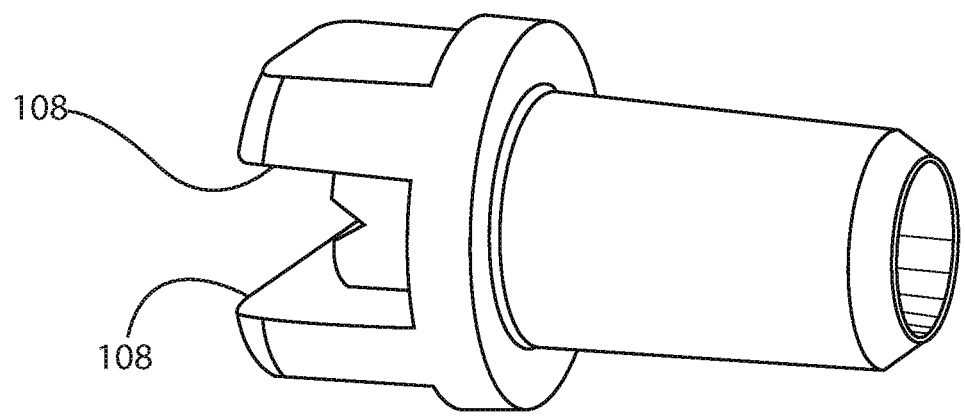
FIG. 8 is a rear facing perspective view of the nozzle of the foam dispensing system shown in FIG. 4.
Figure 9:
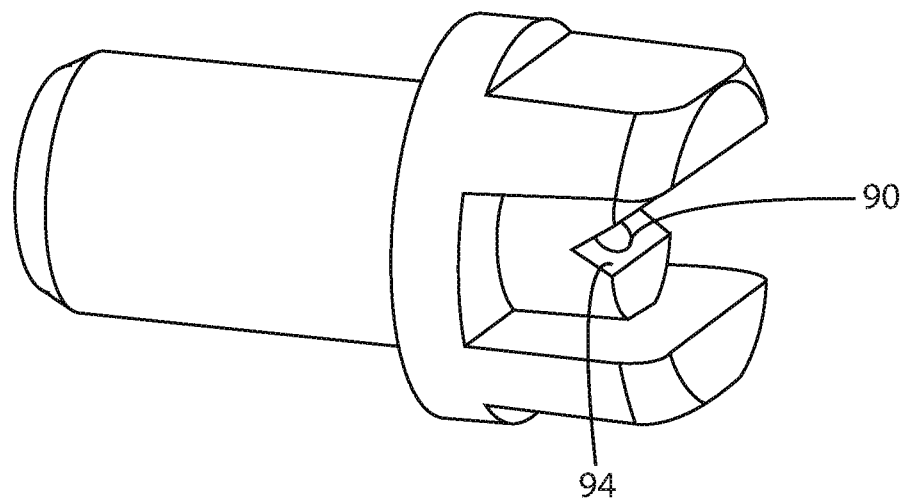
FIG. 9 is a front facing perspective view of the nozzle of the foam dispensing system shown in FIG. 4.
Figure 10:
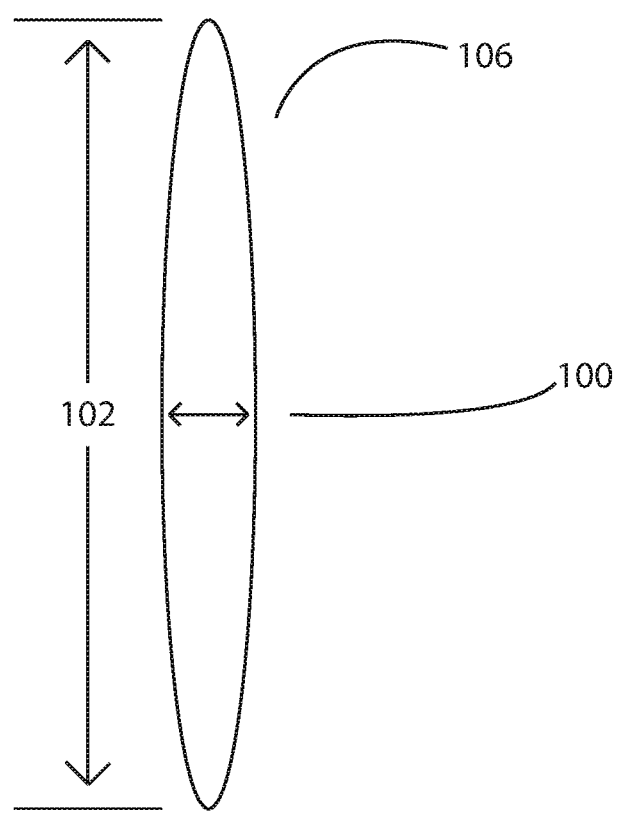
FIG. 10 is an exemplary view of a spray pattern produced by the foam dispensing system of the present invention.
Figure 11:
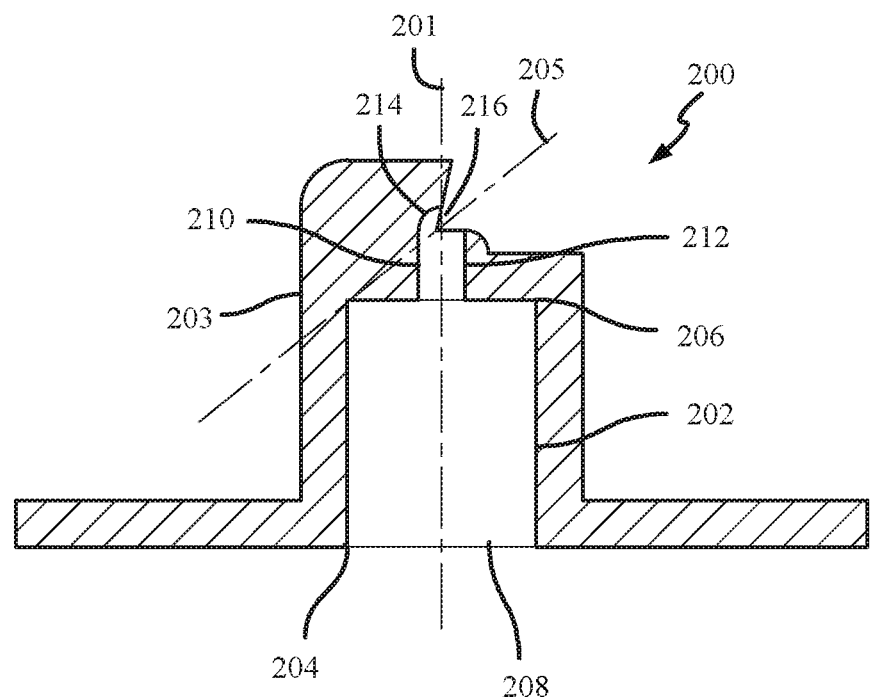
FIG. 11 shows a cross-sectional side view of the nozzle for spraying the composition of the present invention.
Figure 12:
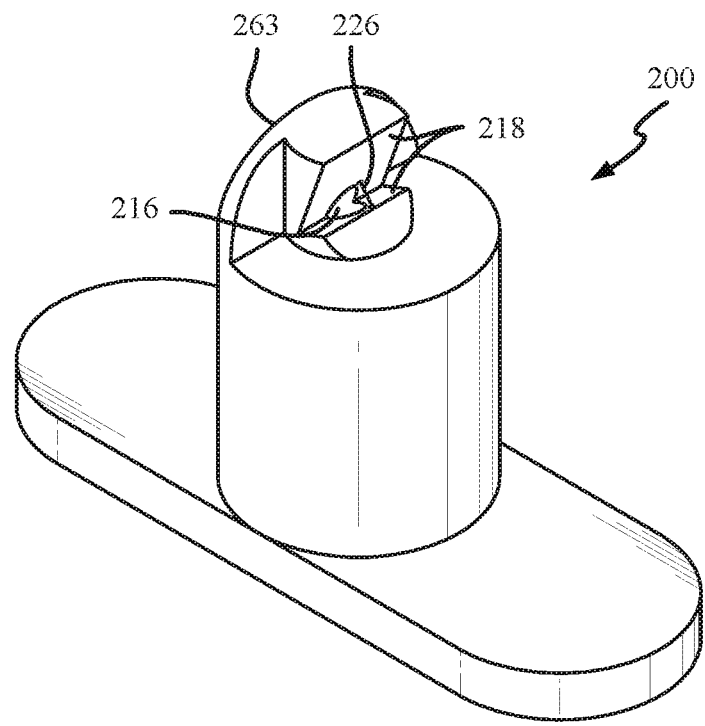
FIG. 12 shows a perspective view of the nozzle for spraying the composition of the present invention.
Figure 13:
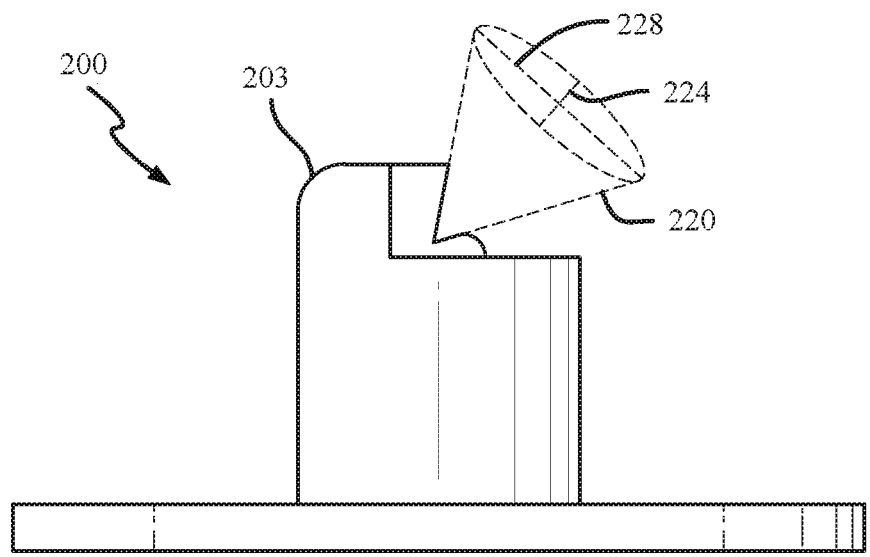
FIG. 13 shows a side view of the nozzle for spraying the composition and the spray pattern of the present invention.

Formed into the nozzle head 84 are inwardly angled v-shaped walls 94 which form a slot 92 (see FIG. 6). The inwardly angled v-shaped walls 94 of slot 92 which intersects with and cuts through a portion of the discharge orifice 90 such that the discharge orifice 90 has an opening in the form of an elongated oval shape 98. (See FIG. 6.) The elongated oval shape 98 of the discharge port 90 causes foamable product to be dispensed from the pressurized source of sprayable foam material in a fan or cone-shaped pattern 106 (see FIG. 10). The length 104 of the elongated oval shape 98 of the discharge orifice 90 tends to control the effective length 102 of the spray pattern 106. (See FIG. 10.) The width 107 of the elongated oval shape 98 of the discharge port tends to control the width of the spray pattern 106. In the exemplary embodiment, the inwardly angled v-shaped walls 94 are about 60 degrees apart and experimentation has shown this degree of angular separation between the v-shaped walls to produce a discharge orifice 90 with an elongated oval shape 98 which produces an effective fan shaped pattern. In other words, as shown in FIG. 4, the v-shaped walls 94 form approximately a 60 degree angle with each other. In some embodiments the angle formed between the v-shaped walls 94 may range from approximately 40 degrees to approximately 130 degrees.

The nozzle head 84 of the nozzle 18 also includes spray limiting walls 108 which are disposed spaced apart from and parallel to the slot 92 of the nozzle head 84. The separation of the spray limiting walls 108 from the slot 92 aids in controlling the effective width 100 of the fan shaped spray pattern 106. The length 102 and width 100 and other shape characteristics of the spray pattern 106 are essentially controlled by the length 104 and width 107 of the elongated oval shape 98 of the discharge orifice 90 and to a lesser degree by the spray limiting walls 108 of the nozzle head 84.

In operation, the adapter-handle 14 is connected to the flexible coupler 16 which in is connected to the nozzle 18. For exemplary purposes only, FIG. 1 depicts the foam dispensing system of the present invention spraying foam material 20 against a surface, such as a wall 22. The adapter-handle 14, flexible coupler 16 and nozzle 18 forms an assembly whereby the adapter-handle 14 is attached (typically by threading) to the source of pressurized sprayable foam material 12. The source of pressurized sprayable foam material 12 has the ability to start and stop the flow of pressurized sprayable foam material. Once the flow of material is started foamable material flows through the adapter-handle 14, through the flexible coupler 16 and is dispensed in an atomized/droplet form by the nozzle 18. By means of the flexible coupler 16, foam may be sprayed in hard to reach places such as under surfaces, behind objects and the like. Another advantage of the foam dispensing system of the present invention is that the flexible coupler 16 and nozzle 18 do not need to be rinsed between uses, which is a significant advantages over prior systems which utilize spray guns which must be cleaned between uses.

In the preferred embodiment, the foamable product is comprised of a polyurethane composition. Unless otherwise stated, the following terms as used herein have the following definitions.

"Hydroxyl number" of a polyol refers to the concentration of hydroxyl groups, per unit weight of the polyol, that are able to react with isocyanate groups. Hydroxyl number is reported as mg KOH/g, and is measured according to the standard ASTM D 1638.

The "average functionality", or "average hydroxyl functionality" of a polyol indicates the number of OH groups per molecule, on average. The average functionality of an isocyanate refers to the number of —NCO groups per molecule, on average.

The meaning of the term "isocyanate prepolymer" includes but is not limited to comprising a mixed polyisocyanate and a polyol in a liquid state.

The meaning of the term "polyisocyanate" includes but is not limited to di or higher isocyanates. The meaning of the term "polyol" includes, but is not limited to, mixtures of polyol and any polyol that can react in a known fashion with an isocyanate in preparing polyurethane foam. A polyol typically contains more than one hydroxyl group, wherein molecules that contain two hydroxyl groups are "diols" and those that contain three hydroxyl groups are "triols," etc.

The meaning of the term "container" refers to a pressurized container such as a pressurized spray can or pressured spray canister, or like device.

The term "single-component" is defined to contrast the prior art "two-component" polyurethane foam, which hardens by a chemical reaction of a resin and hardener, more specifically a reaction between methylene diphenyl diisocyanate (MDI) and glycols that takes place directly during the spraying process. The "single-component" aspect of the polyurethane foam, although it comprises multiple components/ingredients, refers to the main reaction of polymerization of polyisocyanate and polyol forming an isocyanate prepolymer inside a single container, which then hardens through reacting with ambient moisture in the atmosphere. Therefore, a "single-component" product refers to a composition mixed or combined in a single container rather than a two-component product requiring two containers in which their respective contents are mixed with each other during the dispensing phase.

A single-component polyurethane foam may comprise an isocyanate prepolymer filled into a pressurized spray canister or spray can together with at least one blowing agent or hydrocarbon propellant. A user then, for example, may bring the isocyanate prepolymer out of the pressurized spray canister, while the components of the isocyanate prepolymer cure by cross-linking during reaction with ambient moisture.

In some embodiments, the invention accordingly relates to a single-component polyurethane foam comprising at least one polyester or polyether, wherein at least one of them must be a diol with an average functionality f=2, and therefore a linear polymer formed by polymerizing (i.e., a thermoplastic), a hydroxyl value between about 35-180 mg KOH/g, water within the polyester, if present, with volume less than 0.80 wt. %, a pH value of the polyester between about 4-8.5, an acid value below or equal to 0.2 mg KOH/g, and a propellant or blowing agent, preferably hydrocarbon-based and of an alkaline type having the formula $C_nH_{(2n+2)}$ (n being equal to or between 2 and 5). The volume of gas must be considerably bigger than in any of known single-component system and must compound more than 20% (without taking into consideration dimethyl ether and halo-hydrocarbons) of the total mass of pre-polymer sprayed out of a balloon. In this very invention halohydrocarbon gases not only participate in foaming and formation of spongy polymer, but they also play the role of highly intensive extractants which allow spreading the polymer homogeneously over the surface from the distance.

Further, the composition is suitable for use for general insulation purposes, particularly well-suited to be sprayed from a pressurized container, such as a spray can. With a suitable nozzle, the foam composition of the present invention can be sprayed over a surface with a capacity of 1 $m^2$/minute, at a flow rate of the spray of approximately 6 grams per second to approximately 10 grams per second, and gaining a thickness of the coated layer up to 30-50 mm, at typical spray can operating pressures of about 3.5 to 12 atm.

The round slot-shaped orifice allows the polymer to be sprayed over a surface in one very smooth layer; and so that after the final foaming, which takes place not earlier than 15 minutes after spraying, the layer will be smooth and uniform. Other geometrical configurations of the orifice can cause irregularities to the sprayed layer on a surface, which may lead to excessive consumption of product from the spraying system. Further, the viscosity of the product may be varied as necessary to allow the product to be sprayed from spray equipment operating with greater or smaller orifice openings and/or at higher or lower internal pressures.

With reference to FIGS. 12-15, a nozzle 200 of the present invention that can be used with the dispensing system 10 includes a pressure chamber 202 having a proximate end 204 and distal end 206 with a generally circular bore 208 therebetween. Immediately adjacent the pressure chamber 202 is a nozzle head 203. In fluid communication with the distal end 206 of the generally circular bore 208 of the pressure chamber 202 is a discharge tube 210, having a diameter 221 and a proximate end 212, which is exposed to the generally circular bore 208 of the pressure chamber 202. The discharge tube 210, having a central axis 201, terminates at a distal end 214, which terminates at a round slot-shaped discharge orifice 216.

In the exemplary embodiment, formed into the nozzle head 203 are inwardly angled v-shaped walls 218 (see FIG.

13), forming a 60 degree angle that has a bisecting angle 205. In some embodiments, the v-shaped walls 218 may form an angle from about 40 degrees to about 130 degrees. In the preferred embodiment, the inwardly angled v-shaped walls 218 intersect with and cut through a portion of the round slot-shaped discharge orifice 216, such that the bisecting angle 205 is 45 degrees from the central axis 201 of the discharge tube 210. Accordingly, the length 222 of the round slot-shaped orifice 216 corresponds to the diameter 221 of the discharge tube 210.

Figure 14:
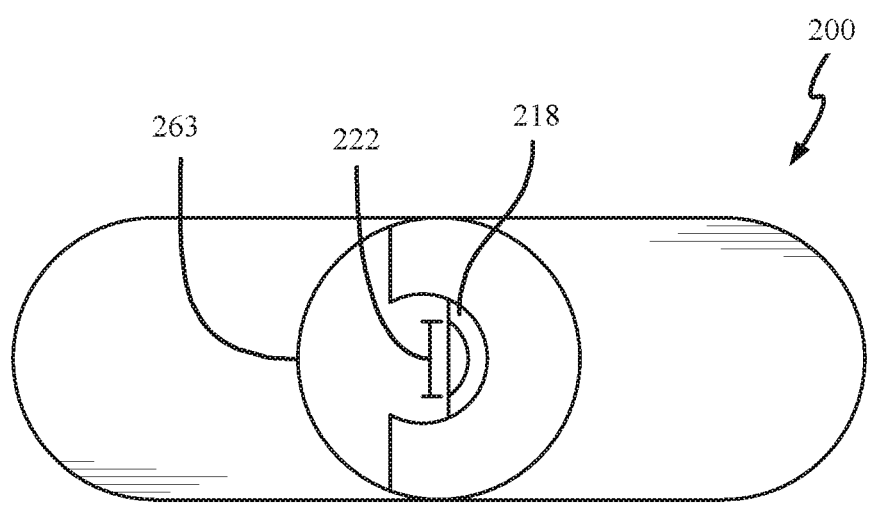
FIG. 14 shows a top view of the nozzle for spraying the composition of the present invention.

As shown in FIG. 14, the shape of the round slot-shaped discharge orifice 216 allows foamable product to be dispensed from the pressurized source of sprayable foam material in a cone-shaped pattern 220. The length 222 of the round slot-shaped discharge orifice 216 tends to control the effective length 224 of the cone-shaped spray pattern 220. The width 226 of the round slot-shaped discharge orifice 216 tends to control the width 228 of the spray pattern 220.

Experimentation has shown that the nozzle 200 having a round slot-shaped orifice 216 helps the foam achieve a uniform structure. Experimentation has further shown that the length 222 of the round slot-shaped orifice 216 should ideally be approximately 1.1 mm to approximately 3.5 mm, or ideally at 2 mm.

Experimental results have shown that the polyurethane foam composition of the present invention when loaded in a spray can with an operating pressure of 3.5 to 12 atm and equipped with the nozzle 200 of the present invention provides structural uniformity in the sprayed foam, as well as high adhesiveness, such that the sprayed foam could not be easily removed from a surface. Further, experimental results also show that, when the nozzle 100 of the present invention is used with other one-component polyurethane compositions, the following results are obtained:

When other single-component polyurethane compositions' foams are cut in half, they have ununiformed structures, but there are big and small holes.

Other one-component polyurethane compositions' foams were spraying tiny streams (unlike the foam of the present invention that comes out in a wide cone), and yet other one-component polyurethane compositions' foams hardly came out at all.

All other single-component polyurethane compositions' foams had low adhesiveness, such that we could easily remove the sprayed foams from a surface (unlike the foam of the present invention that could not be removed from the surface without equipment).

The maximum thickness of the coating layer of all other single-component polyurethane compositions' foams was approximately 1 cm (while thickness of the coating layer of the foam of the present invention reached up to approximately 5 cm).

In making the composition, the pre-polymer of polyurethane is dissolved in liquid hydrocarbons and is exposed to the pressure of 3.5-12 atm in the container. The tip of the nozzle governs shaping the composition, into a narrow cone directed onto a surface, which allows adjusting the thickness of the layer and preventing excessive use of the material while spraying. The tip itself does not protect the polymer from the suspended conditions (polymer+gas), which is why the foaming of the product on the surface (and not at the moment of spraying out of the gun) is possible.

The nozzle tip, which shapes the stream of polymer coming out of the gun into a stable flat spray cone, is used which adjusts the stream of outcoming polymer as needed for spraying the surface. Initially the tip suits most spraying guns and serves as their extension. In other words, it is mounted directly onto the gunpoint and is fixed there by means of lock rings or friction. The diameter of the seat is within 6-10 mm.

The outlet diameter for the nozzle tip is 2 mm, but it can also vary within 1.1-3.5 mm. Two notch grooves, transversal to the outlet and executed at 45 degrees to the bisecting line (can vary from 20 to 65 degrees) are also an integral parts of the nozzle tip. It provides the flat shape of the outcoming polymer which is optimal for the spraying.

The outlet itself can be deflected towards direction of the gunpoint, which makes it possible to adjust the angle of the stream while spraying the polymer. The design feature of the nozzle tip is that polymer going through it does not separate and the whole volume of dissolved gases stays within the structure for further foaming of polyurethane.

The cone-shaped pattern is created by the nozzle tip. The width of the spraying (flat cone) depends on the temperature of the container (the temperature inside the container must be 10-500 C) as well as on the distance to the sprayed surface, and can vary from 100 to 400 mm. The distance from the nozzle tip to the sprayed surface must be within 100-800 mm.

A sprayed sample, with thickness of 50 mm does not burn through while being exposed to the temperature of 6500 C for more than 45 minutes. It forms a carbonized crust, and does not sustain combustion. Therefore, the polyurethane foam has fireproof properties.

In use, a user may thermally insulate a structural area by dispensing a single-component polyurethane composition in a cone-shaped spray pattern on the structural area with a dispensing system 10 described in the present application. Preferably, the dispensing system 10 has a flow rate of approximately 6 grams per second to approximately 10 grams per second to cover a surface of the structural area with a capacity of 1 square meter per minute. In addition, due to the capabilities of the dispensing system and the composition of the polyurethane foam, the polyurethane composition applied on a surface of the structural area can create a coated layer of 30 mm to 50 mm thick.

In order to access hard to reach places, the dispensing system 10 is equipped with a flexible couple so the user can bend the coupler around corners, tight spaces, obstructions and the like, to access the hard to reach places.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A method for thermally insulating a structural area, comprising:
dispensing, a single-component polyurethane composition in a cone-shaped spray pattern on the structural area with a dispensing system that has a flow rate of approximately 6 grams per second to approximately 10 grams per second to, cover a surface of the structural area with a capacity of 1 square meter per minute, whereby the polyurethane composition applied on a surface of the structural area creates a coated layer of 30 mm to 50 mm,
1) the dispensing system, comprising:

i) a pressurized container containing the polyurethane composition, the pressurized container having a pressure from 3.5 atmospheres to 12 atmospheres;
ii) a handle in fluid communication with the pressurized container;
iii) a clear, flexible coupler in fluid communication with the handle for accessing hard to reach places; and
iv) a nozzle in fluid communication with the flexible coupler, wherein the nozzle includes a pressure chamber in fluid communication with a discharge tube, the discharge tube having a discharge orifice, wherein the discharge orifice has a shape of an oval having a predetermined width and a predetermined length, wherein a slot defined by v-shaped walls intersects the discharge orifice and forms the oval shape of the orifice, wherein the nozzle includes spray limiting walls, one spray limiting wall disposed on each side of the slot having v-shaped wherein the v-shaped walls of the slot define an angle of about 60 degrees;

2) the polyurethane composition, comprising:
i) a polyol selected from the group consisting of a polyether and a polyester, wherein the polyol is a diol with a functionality rate of 2, a hydroxyl value from 35 to 180 mg KOH per gram, and a pH from 4 to 8.5;
ii) a volume of water less than 0.8 percent by weight of the total polyurethane composition;
iii) an acid value of 0.2 to KOH per gram or less; and
iv) a propellant comprising a hydrocarbon of the formula CnH(2n+2), where n is an integer from 2 to 5, the propellant present in an amount of at least 20 percent by weight more than the polyol.

2. A method for thermally insulating a structural area, comprising:
dispensing a polyurethane composition in a cone spray pattern on the structural area with a dispensing system,
1) the dispensing system, comprising:
i) a pressurized container containing the polyurethane composition, the pressurized container having a pressure from 3.5 atmospheres to 12 atmospheres;
ii) a handle in fluid communication with the pressurized container;
iii) a flexible coupler in fluid communication with the handle; and
iv) a nozzle in fluid communication with the flexible coupler, wherein the nozzle includes a pressure chamber in fluid communication with a discharge tube, the discharge tube having a discharge orifice, wherein the discharge orifice has a shape of an oval having a predetermined width and a predetermined length, wherein a slot defined by v-shaped walls intersects the discharge orifice and forms the oval shape of the orifice, wherein the nozzle includes spray limiting walls, one spray limiting wall disposed on each, side of the slot having v-shaped walls;
2) the polyurethane composition, comprising:
i) a polyol selected from the group consisting of a polyether and a polyester, wherein the polyol is a diol with a functionality rate of 2, a hydroxyl value from 35 to 180 mg KOH per gram, and a pH from 4 to 8.5;
ii) a volume of water less than 0.8 percent by weight of the total polyurethane compositional;
iii) an acid value of 0.2 mg KOH per gram or less; and
iv) a propellant comprising a hydrocarbon of the formula CnH(2n+2) where n is an integer from 2 to 5, the propellant present in an amount of at least 20 percent by weight more than the polyol.

3. The method of claim 1, wherein the coupler is made from a clear, flexible material.

4. The method of claim 2, further comprising bending the coupler to insulate hard to reach places.

5. The method of claim 3, wherein the dispensing step comprises spraying the polyurethane composition with a flow rate of approximately 6 grams per second to approximately 10 grams per second.

6. The method of claim 4, wherein the dispensing step comprises covering a surface of the structural area with a capacity of 1 square meter per minute.

7. The method of claim 5, whereby the polyurethane composition applied on a surface of the structural area creates a coated layer of 30 mm to 50 mm.

8. The method of claim 6, wherein the angle between the v-shaped walls of the slot is about 60 degrees.

9. The method of claim 7, wherein propellant comprises a halohydrocarbon.

10. A method for insulating a structural area, the method comprising:
dispensing a polyurethane composition comprising a prepolymer dissolved in a liquid hydrocarbon, in a cone-shaped spray pattern on the structural area with a dispensing system,
1) the dispensing system, comprising:
i) a pressurized container containing the polyurethane composition;
ii) a handle in fluid communication with the pressurized container;
iii) a flexible coupler in fluid communication with the handle; and
iv) a nozzle in fluid communication with the flexible coupler, wherein the nozzle includes a pressure chamber in fluid communication with a discharge tube, the discharge tube having a discharge orifice, wherein a slot defined by v-shaped walls intersects the discharge orifice;
2) the polyurethane composition, comprising:
1) a diol with a functionality rate of 2, a hydroxyl value from 35 to 180 mg KOH per gram, and a pH from 4 to 8.5; and
ii) a propellant comprising a hydrocarbon of the formula CnH(2n+2), where n is an integer from 2 to 5, whereby the structural area is insulated.

11. The method of claim 10, wherein the pressurized container has a pressure from 3.5 atmospheres to 12 atmospheres.

12. The method of claim 10, wherein the discharge orifice has a shape of an oval having a predetermined width and a predetermined length.

13. The method of claim 10, further comprising bending the coupler to insulate hard to reach places.

14. The method of claim 10, wherein the dispensing step comprises spraying the polyurethane composition with a flow rate of approximately 6 grams per second to approximately 10 grams per second.

15. The method of claim 10, wherein the dispensing step comprises covering a surface of the structural area with a capacity of 1 square meter per minute.

16. The method of claim 10, whereby the polyurethane composition applied on a surface of the structural area creates a coated layer of 30 mm to 50 mm.

17. The method of claim 10, wherein the angle between the v-shaped walls of the slot is about 60 degrees.

18. The method of claim 10, wherein propellant comprises a halohydrocarbon.

19. The method of claim 10, wherein the polyurethane composition has an acid value of 0.2 mg KOH per gram or less.

* * * * *